(12) United States Patent
Goldenberg et al.

(10) Patent No.: US 7,016,376 B1
(45) Date of Patent: Mar. 21, 2006

(54) METHOD AND APPARATUS FOR SCHEDULING UPSTEAM DATA PACKETS IN A BROADBAND COMMUNICATION SYSTEM

(75) Inventors: Moshe Goldenberg, Karmiel (IL); Oded Shoshani, Jerusalem (IL)

(73) Assignee: Conexant Systems, Inc., Newport Beach, CA (US)

( * ) Notice: Subject to any disclaimer, the term of this patent is extended or adjusted under 35 U.S.C. 154(b) by 1136 days.

(21) Appl. No.: 09/892,069

(22) Filed: Jun. 26, 2001

(51) Int. Cl.
   *H04J 3/16* (2006.01)
(52) U.S. Cl. .................. 370/468; 370/395.42
(58) Field of Classification Search ............ None
   See application file for complete search history.

(56) References Cited

U.S. PATENT DOCUMENTS

| | | | |
|---|---|---|---|
| 6,546,017 B1 * | 4/2003 | Khaunte | 370/412 |
| 6,816,940 B1 * | 11/2004 | Brooks et al. | 710/308 |
| 6,877,043 B1 * | 4/2005 | Mallory et al. | 709/251 |
| 2001/0055319 A1 * | 12/2001 | Quigley et al. | 370/480 |
| 2003/0086140 A1 * | 5/2003 | Thomas et al. | 359/167 |

OTHER PUBLICATIONS

"Data-Over-Cable Service Interface Specifications, Radio Frequency Interface Specification SP-RFv1.1-I05-000714", Cable Television Laboratories, Inc., 1999-2000, Sections 3.1-3.6.2 and 7.1-7.5.2, pp. 11-21 and 129-141.

* cited by examiner

*Primary Examiner*—Duc Ho
*Assistant Examiner*—Thien D. Tran (57) ABSTRACT

A method and apparatus for scheduling upstream data packets in a communication system is described. The present inventive method obtains a priority value (PV) for an upstream data packet and compares (using hardware registers) the PV of a queued upstream data packet to a current system timer. In accordance with one embodiment of the present invention, the current system timer comprises the current clock time of the communication system. When a PV equals the current system timer, the method transmits the upstream data packet associated with the PV to the CMTS via the upstream transmission path.

19 Claims, 6 Drawing Sheets

METHOD AND APPARATUS FOR SCHEDULING UPSTEAM DATA PACKETS IN A BROADBAND COMMUNICATION SYSTEM

BACKGROUND OF THE INVENTION

1. Field of the Invention

This invention relates to the field of communication systems, and more particularly to a method and apparatus for scheduling upstream data packets in a broadband communication system.

2. Description of Related Art

Figure 1:
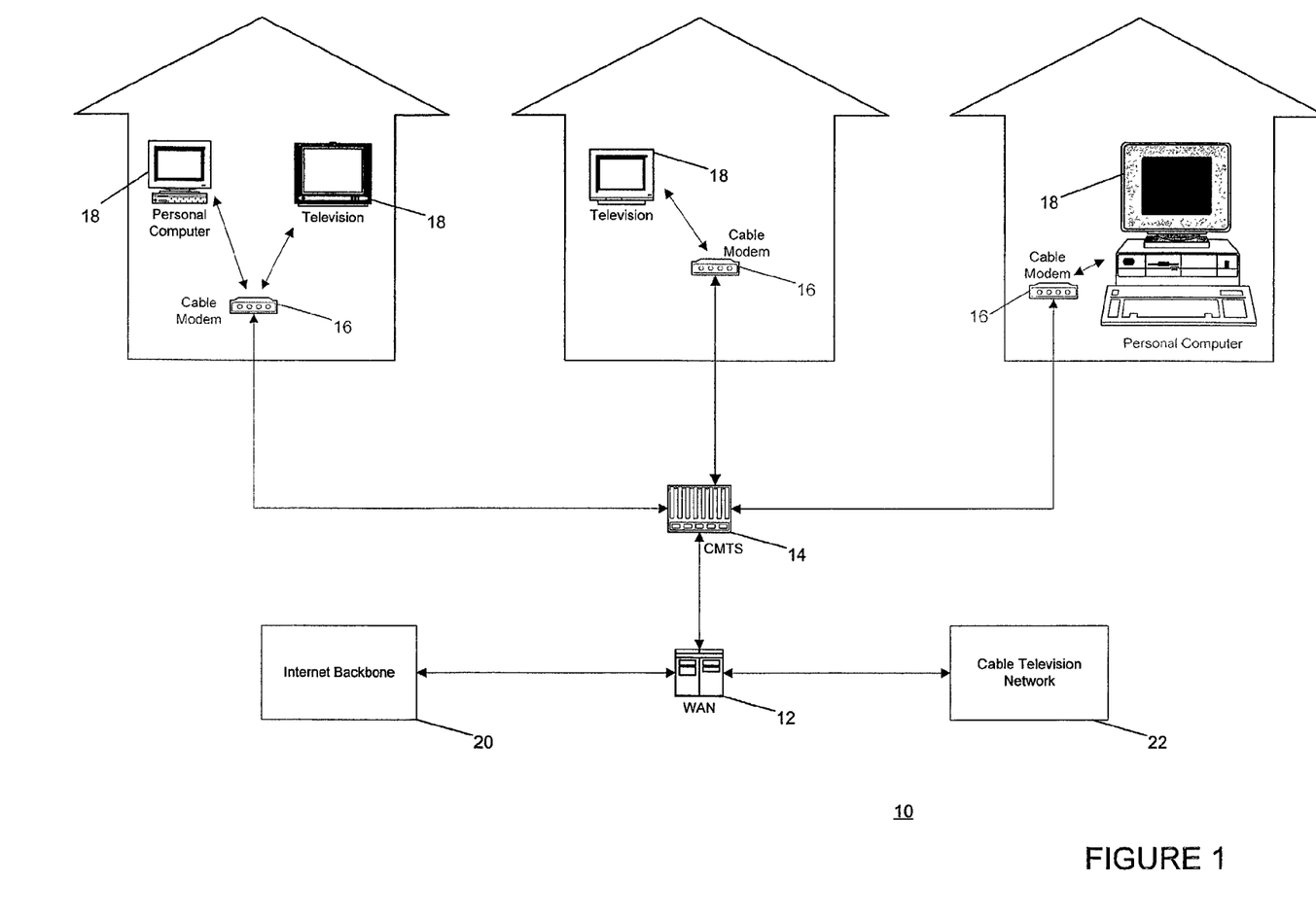
FIG. 1 depicts a simplified block diagram of an exemplary cable modem system.

Broadband communication systems facilitate high-speed connectivity and data transport from a point-to-multipoint basis. Exemplary broadband communication systems include cable modem systems that facilitate data transport between cable modems and information providers such as cable television networks and Internet web sites. FIG. 1 depicts a simplified block diagram of an exemplary cable modem system. As shown in FIG. 1, an exemplary cable modem system 10 comprises a wide area network (WAN) 12, a cable modem termination system (CMTS) 14, a plurality of cable modems (CM) 16 and a plurality of customer premises equipment (CPE) 18 (e.g., personal computers and televisions). The WAN 12 connects the cable modem system 10 to other networks such as a cable television network 22 or the well-known Internet via an Internet backbone 20. The CMTS 14 connects the plurality of cable modems 16 to the WAN 12. Cable modems typically provide high-speed Internet and cable television connectivity to businesses and homes.

Cable modem systems are described in more detail in a specification published by the Cable Television Laboratories, Inc., entitled "Data-Over-Cable Service Interface Specification Radio Frequency Interface Specification SP-RFIv1.1-I05-000714", electronically available to the public at the URL of <http://www.cablemodem.com/specifications.html>, published in the year 2000, referred to hereinbelow as the "DOCSIS specification", and hereby incorporated for reference herein in its entirety for its teachings on cable modem systems. As described in the DOCSIS specification, data packets transport data between cable modems and their associated CMTS. Upstream connectivity is defined herein as the transmission of data from the customer premises equipment. Downstream connectivity is defined herein as the transmission of data to the customer premises equipment (e.g., from a cable television network to the CPE). In cable modem systems, well-known protocols such as TDD and TDMA aid in scheduling data packet traffic on the upstream and downstream transmission paths.

Due to the wide variety of CPE service requirements, and due to the large number of CPEs serviced by any one CMTS, the bandwidth scheduling process in a broadband communication system such as that shown in FIG. 1 can become burdensome and complex. This is especially true with regard to the scheduling of upstream bandwidth. A CMTS typically schedules upstream bandwidth by assigning transmit opportunities on the upstream to its associated cable modems. A cable modem (CM) schedules upstream data from its associated CPEs by buffering the upstream data in an upstream input queue. The CM transmits upstream data from the upstream input queue to the CMTS during the CM's upstream transmit opportunities. Cable modems schedule upstream data within their input queues based on various factors such as message priority, message type and input order. Methods of scheduling upstream data help provide high-speed connectivity and data transport in broadband communication systems.

One method of scheduling upstream data utilizes well-known data transport techniques including burst information structures (BIS) and a linked list. The linked list comprises a plurality of BIS wherein a BIS is assigned a specific location within the linked list depending upon the "time to send" (TTS) of the BIS. The BIS are data structures containing information relating to the upstream data to be transported by a CM. In accordance with the now-described method of scheduling upstream data, a BIS comprises a TTS, a pointer to the upstream data and a next BIS (NB) pointer. The NB pointer points to the BIS located immediately after the current BIS on the linked list. The linked list is sorted in ascending order of TTS. Thus, the top or first BIS element of the linked list contains the next BIS to be transmitted. When software or firmware within the CM creates a new BIS, the software/firmware assigns the new BIS to its designated location within the linked list based upon the scheduled upstream transmission time of the BIS. Accordingly, the software/firmware rewrites NB pointers of adjacent BIS when a new BIS is inserted in the linked list. Thus, the NB pointer of the BIS immediately preceding the new BIS points to the new BIS. The NB pointer of the new BIS points to the BIS immediately after the new BIS. Disadvantageously, implementation of the above-described method for scheduling upstream data is relatively slow and complex. Due to software/firmware processing delays related to the linked list, the above-described method slows system performance. For example, upstream programming of the CM's microprocessor can cause as much as a 30 microsecond delay caused by response time to the well-known ARM microprocessor fast interrupt (FIQ). Also, processing delays of as much as 5 microseconds can occur when a new BIS is created because the software/firmware must sort the linked list. Another disadvantage of the above-described method is the added expense associated with programming and debugging the complex software/firmware source code needed to implement a linked list of BIS.

Therefore, a need exists for a method and apparatus for scheduling upstream data packets in a broadband communication system that is easily implemented, relatively fast and overcomes the disadvantages of prior art methods and apparatuses such as the above-described linked list of BIS method. The present invention provides such an upstream data packet scheduling method and apparatus.

SUMMARY OF THE INVENTION

The present invention is a novel inventive method and apparatus for scheduling upstream data packets in a broadband communication system. In a first embodiment of the present invention, the method obtains a priority value (PV) for an upstream data packet. The method compares (using hardware registers) the PV of a queued upstream data packet to a current system timer. In accordance with one embodiment of the present invention, the current system timer comprises the current clock time of the communication system. When a PV equals the current system timer, the method transmits the upstream data packet associated with the PV to the CMTS via the upstream transmission path.

In a second embodiment of the present invention, the method begins by determining whether a cable modem has received a new data packet from an associated CPE for transmission on the upstream. If so, the method of the second embodiment creates a new BIS and the new data packet is sent to the associated CM's input queue. The new BIS comprises a TTS and a pointer to upstream data to be transmitted. The method of the second embodiment then writes the TTS and the pointer to upstream data to be transmitted into an upstream hardware register set. After performing the above-described tasks the method then proceeds to compare all TTS registers to the current system timer via the upstream hardware register sets. The method transmits an upstream data packet when the data packet's associated TTS equals the current system timer.

In a third embodiment of the present invention, the method begins by comparing all TTS registers to the current system timer. The method transmits an upstream data packet when the data packet's associated TTS equals the current system timer. The method then determines whether the cable modem has received a new data packet from an associated CPE for transmission on the upstream. If so, the method creates a new BIS and the new data packet is sent to the associated CM's input queue. The new BIS comprises a TTS and a pointer to upstream data to be transmitted. The method of the third embodiment then writes the TTS and the pointer to upstream data to be transmitted into an upstream hardware register set.

In a fourth embodiment of the present invention, the method begins by determining whether a cable modem has created a new BIS. If so, the method of the fourth embodiment finds a free upstream hardware register set and writes data packet information into the free register set. In accordance with the fourth embodiment of the present invention, the method writes a TTS and a pointer to upstream data to be transmitted. After performing the above-described tasks the method then proceeds to compare all TTS registers of the upstream hardware register sets to the current system timer. The method transmits an upstream data packet when the data packet's associated TTS equals the current system timer.

BRIEF DESCRIPTION OF THE DRAWINGS

Like reference numbers and designations in the various drawings indicate like elements.

DETAILED DESCRIPTION OF THE INVENTION

Throughout this description, the preferred embodiment and examples shown should be considered as exemplars, rather than as limitations on the present invention.

The present invention is a method and apparatus for scheduling upstream data packets in a broadband communication system. The present inventive method and apparatus utilizes multiple hardware registers to compare priority values of data packets to a system timer and to transmit upstream data packets on the upstream transmission paths. In one embodiment of the present invention, the upstream data packet scheduling method and apparatus simultaneously compares multiple hardware registers in a parallel configuration. In another embodiment, the present inventive method sequentially compares multiple hardware registers in a serial configuration. In accordance with the present invention, a data packet is transmitted on the upstream when the data packet's corresponding and associated priority value matches the system timer. In one embodiment, the priority value comprises a data packet's "time to send" value. In another embodiment, the priority value comprises the sum of a data packet's "time to send" and an offset. The present invention can be utilized with a number of broadband communication systems. One exemplary broadband system is a cable modem system. An exemplary cable modem system adapted for use with the present invention is now described.

An Exemplary Cable Modem System Adapted for use with the Present Invention

An exemplary broadband communication system adapted for use with the present invention is described below with reference to FIG. 2. The exemplary cable modem system described below is described in greater detail in the DOCSIS specification which has been incorporated by reference hereinabove. One skilled in the art shall recognize that the exemplary broadband communication system is not meant to be a limitation to the present invention as other broadband communication systems can be utilized with the present invention without departing from the scope or spirit of the present invention. Examples of other broadband communication systems that can be utilized with the present invention include broadband wireless communication systems, cellular IP communication systems and satellite communication systems. The present invention can be utilized in any broadband communication system where the upstream scheduling of data is desired.

Figure 2:
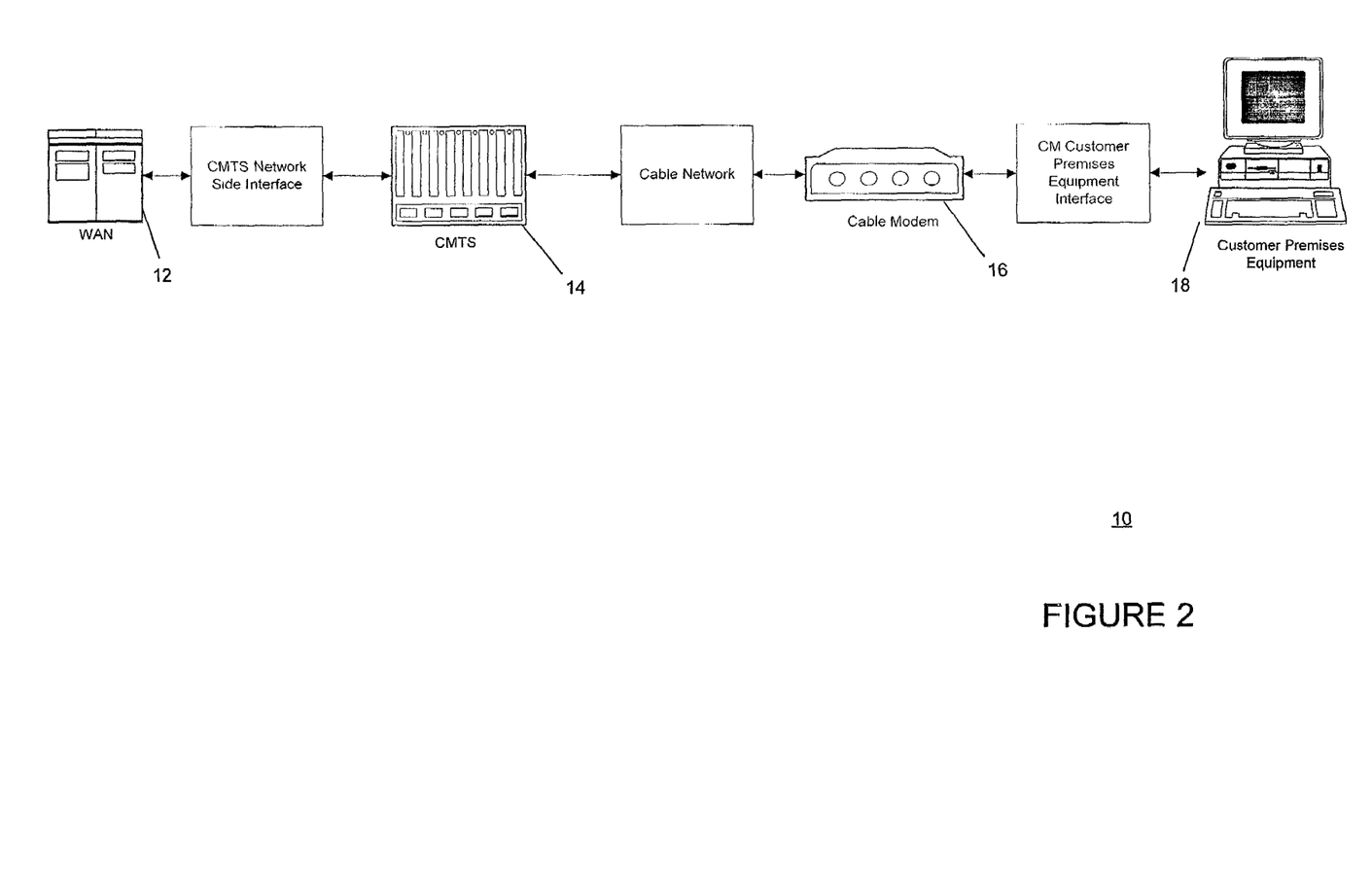
FIG. 2 depicts a simplified block diagram of an exemplary cable modem system adapted for use with the present invention.

FIG. 2 depicts a simplified block diagram of an exemplary cable modem system adapted for use with the present invention. As shown in FIG. 2 and described in more detail in the DOCSIS specification incorporated by reference herein, the exemplary cable modem system 10 comprises a wide-area network (WAN) 12, a cable modem termination system (CMTS) 14, a cable modem (CM) 16 and a customer premises equipment (CPE) 18. The WAN 12 operatively connects the CMTS 14 to other networks such as the well-known Internet via an Internet backbone 20 (FIG. 1) or a cable television network 22 (FIG. 1) via a CMTS network side interface.

The CMTS 14 is operatively connected to the cable modem 16 via a cable network. Although FIG. 2 depicts only one cable modem 16 operatively connected to the CMTS 14, one skilled in the communication art shall recognize that the exemplary cable modem system multiple cable modems connected to the CMTS 14. The cable modem 16 is connected to the customer premises equipment 18 via a cable modem CPE interface. Those skilled in the communication art shall also recognize that multiple CPEs 18 can be connected to the CM 16.

The exemplary cable modem communication system shown in FIG. 2 utilizes a Time-Division Duplexing (TDD) modulation scheme. One skilled in the communication art shall recognize that other modulation schemes such as TDMA and CDMA can be utilized with the exemplary cable modem system without departing from the scope or spirit of the present invention.

In the exemplary cable modem system of FIG. 2, the cable modem 16 comprises a well-known ARM microprocessor and a plurality of upstream hardware register sets. In accordance with the present invention, the cable modem's ARM microprocessor creates burst information structures (BIS) when a CPE transmits data packets to the CM for upstream transmission. In the exemplary cable modem system, a BIS comprises a time to send (TTS) and a pointer to the upstream data. In one embodiment of the exemplary cable modem system, an upstream hardware register set comprises a TTS register and an upstream data pointer register. In another embodiment of the exemplary cable modem system, an upstream hardware register set comprises a TTS register, a count/$L_{mod}$ register and a pointer to upstream data to be transmitted. In one embodiment, the ARM microprocessor comprises 32 upstream hardware register sets. Those skilled in the art shall recognize that other numbers of upstream hardware register sets such as 16 and 64, can be used without departing from the scope or spirit of the present invention. As described in more detail below, the hardware register sets aid in comparing priority values to a current system timer and in transmitting upstream data packets on the upstream transmission path.

The exemplary cable modem communication system shown in FIG. 2 can be used in conjunction with several embodiments of the present invention described below. A first embodiment of the present invention is now described.

A First Embodiment of the Present Invention

In a first embodiment of the inventive method obtains a priority value (PV) for an upstream data packet. The PV can be based on a "time to send" (TTS), a sum of a TTS and an offset, a message type or a message priority. The method of the first embodiment compares the PV of a queued upstream data packet to a current system timer. The current system timer comprises the current clock time of the communication system. One skilled in the communication art shall recognize that the current system timer can comprise other upstream data packet triggering events such as priority or type. When a PV is equal to the current system timer, the method transmits the upstream data packet to the CMTS via the upstream. The first embodiment of the present invention is now described in more detail below.

Figure 3:
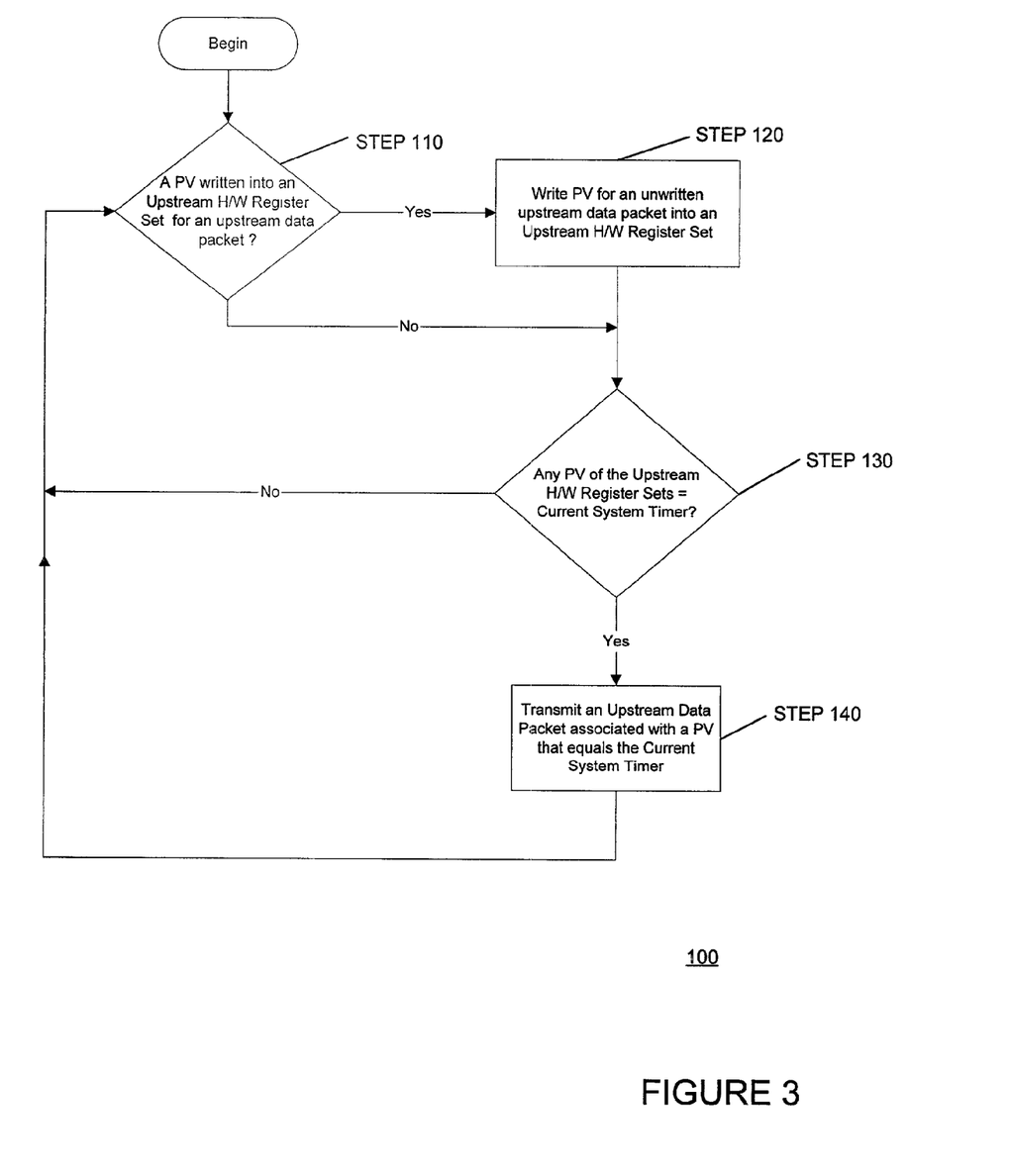
FIG. 3 shows a flowchart of a first embodiment of the method of the present invention.

FIG. 3 shows a flowchart of a first embodiment of the method of the present invention. As shown in FIG. 3, the first embodiment of the inventive method first determines whether a PV has been written into an upstream hardware register set for an upstream data packet read by the CM. If so, the method proceeds to a STEP 120, else the method proceeds to a decision STEP 130. At the STEP 120 the method writes a PV for an unwritten upstream data packet into an upstream hardware register set. The method then proceeds to the decision STEP 130 whereat the method determines whether any PV of the plurality of upstream hardware register sets equals the current system timer. If so, the method proceeds to a STEP 140, else the method returns to the decision STEP 110. At the STEP 140 the method transmits an upstream data packet associated with the PV that equals the current system timer as determined at the decision STEP 130. The method then returns to the decision STEP 110.

In one embodiment, the steps are implemented using an ARM microprocessor. In accordance with the first embodiment, the plurality of upstream hardware register sets described in STEPS 110 and 120 are also implemented using the ARM microprocessor. One skilled in the communications art shall recognize that the plurality of register sets can be implemented using other techniques without departing from the scope or spirit of the present invention. For example, the plurality of hardware register sets can be implemented in a logic gate array or similar means. In accordance with the present inventive method, STEPS 130 and 140 are implemented in a hardware device that can compare upstream hardware register sets and transmit upstream data packets independently from the first embodiment. Thus, the hardware device can compare at a set interval that is independent from STEPS 110 and 120 (e.g., continuously, once per millisecond and once per second).

In one embodiment, all upstream hardware register sets are configured in a parallel configuration. In this embodiment at the decision STEP 130, the hardware compares the plurality of upstream hardware register sets concurrently. In another embodiment, all upstream hardware register sets are configured in a serial configuration. In this embodiment, the plurality of upstream hardware register sets are compared in a serial manner. In yet another embodiment, all upstream hardware register sets are configured in a parallel-serial configuration. In this configuration, all upstream hardware register sets are configured into several groups of register sets. In this embodiment, the register sets in a group of register sets are compared concurrently to the current system timer at the STEP 130. The hardware then compares the next group of register sets in the same manner and the method proceeds in a serial manner until all groups of register sets are compared to the current system timer. A second embodiment of the present invention is now described.

A Second Embodiment of the Present Invention

In a second embodiment of the present invention, the method begins by determining whether a cable modem received a new data packet from an associated CPE for transmission on the upstream by the CM. If the cable modem received a new data packet, the method creates a new BIS and the new data packet is sent to the CM's input queue. The new BIS comprises a TTS and a pointer to upstream data. The method of the second embodiment then writes the TTS and the pointer into an upstream hardware register set. The method then compares all of the TTS registers to the current system timer. The method transmits an upstream data packet when the data packet's associated TTS equals the current system timer.

Figure 4A:
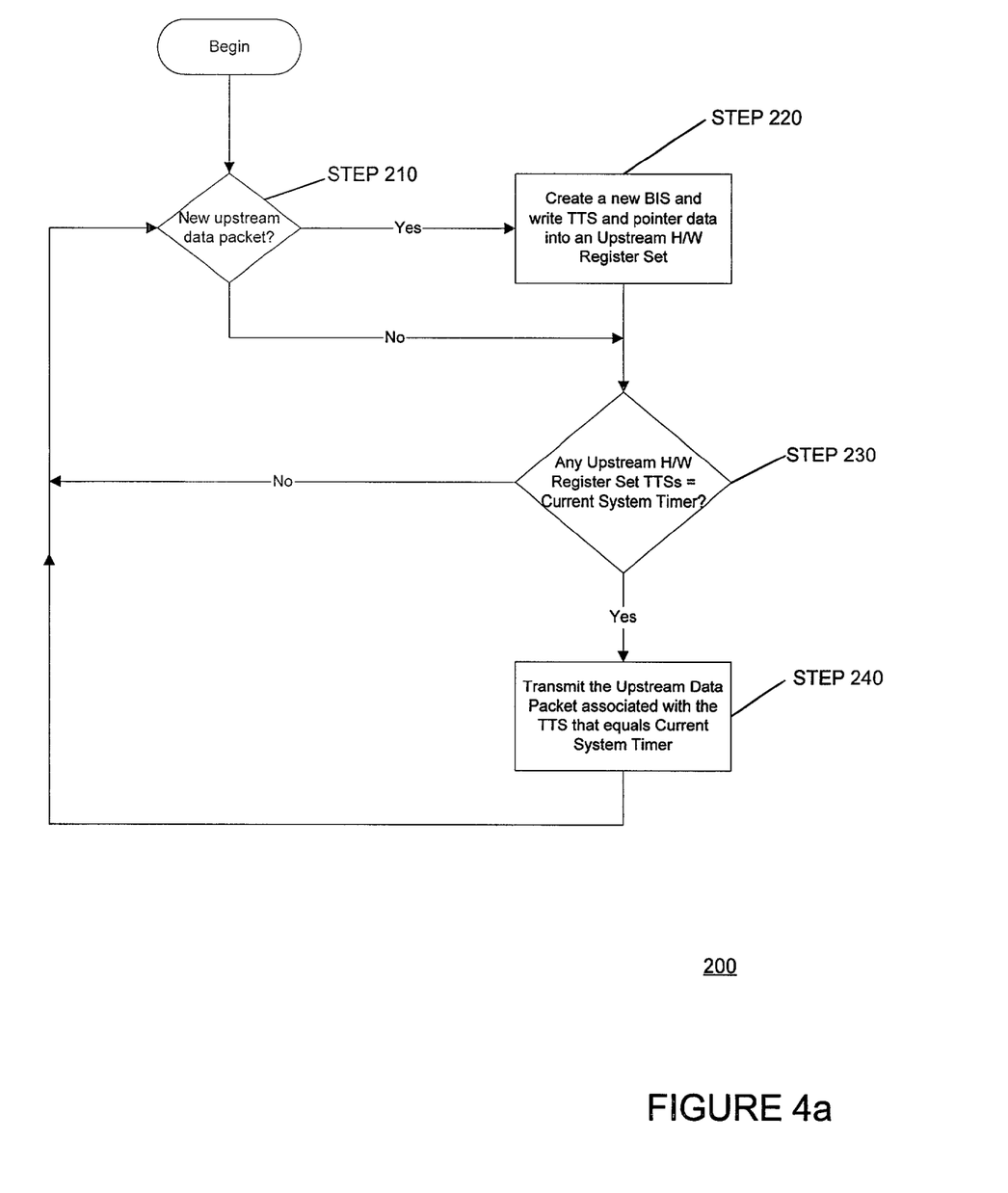
FIG. 4a shows a flowchart of a second embodiment of the method of the present invention.

FIG. 4a shows a flowchart of a second embodiment of the method of the present invention. As shown in FIG. 4a, the second embodiment 200 first determines at a decision STEP 210 whether the CM received a new upstream data packet. If so, the method proceeds to a STEP 220, else the method proceeds to a decision STEP 230. At the STEP 220 the method creates a new BIS and writes information regarding the new upstream data packet into an upstream hardware register set. In one embodiment, the new BIS comprises a TTS and a pointer to upstream data to be transmitted. The information regarding the new upstream data packet written into the upstream hardware register set comprises the TTS and the pointer to upstream data to be transmitted. The method then proceeds to the decision STEP 230 whereat the method determines whether any TTS of the plurality of upstream hardware register sets equals the current system timer. If so, the method proceeds to a STEP 240, else the method returns to the decision STEP 210. At the STEP 240 the method transmits an upstream data packet associated with the TTS that equals the current system timer as determined at the decision STEP 230. The method then returns to the decision STEP 210.

A Third Embodiment of the Present Invention

Figure 4B:
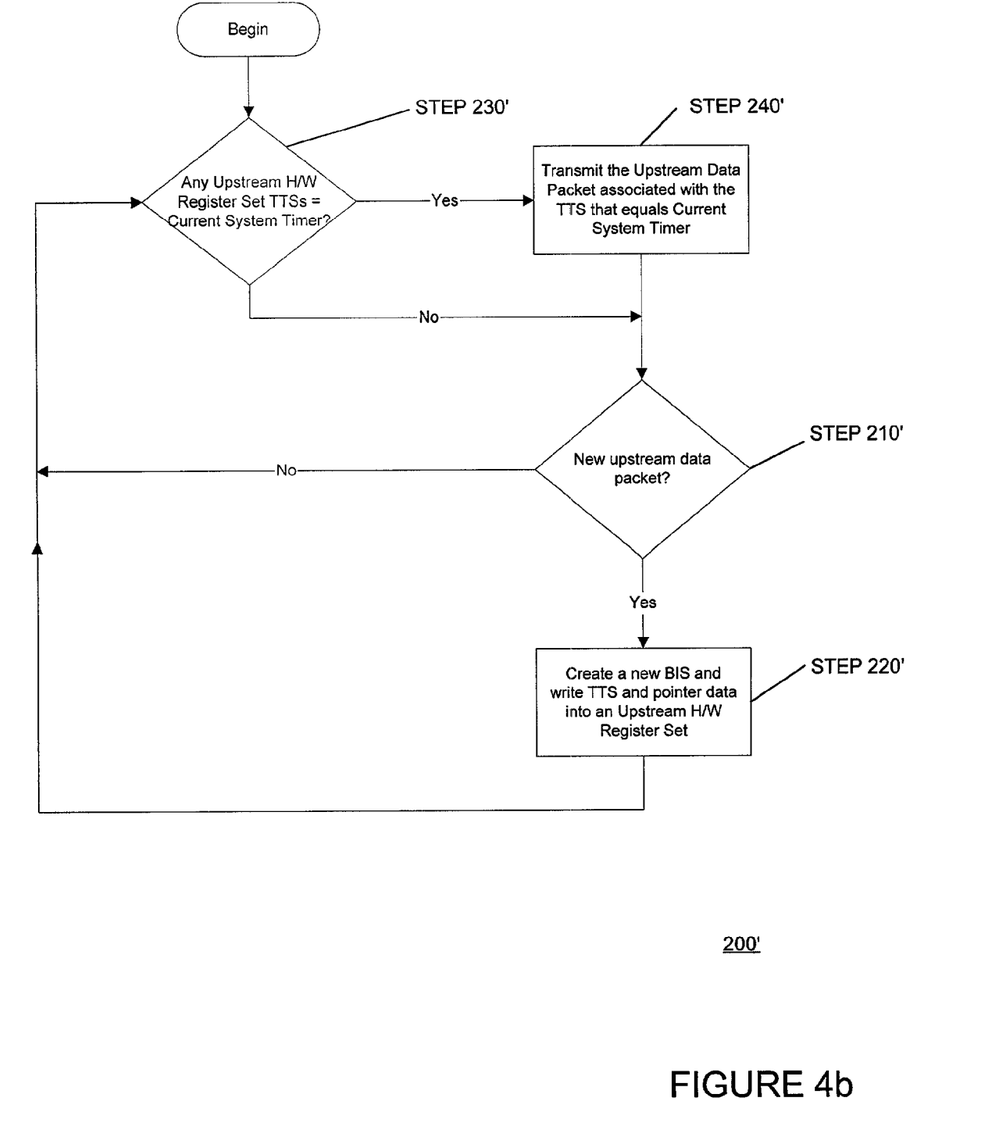
FIG. 4b shows a flowchart of a third embodiment of the method of the present invention.

In a third embodiment of the present invention, the method with reference to FIG. 4b begins by comparing all TTS registers to the current system timer. The method transmits an upstream data packet when the data packet's associated TTS equals the current system timer. The method then determines whether the cable modem received a new data packet from an associated CPE for transmission on the upstream by the CM. If so, the method creates a new BIS and the new data packet is sent to the CM's input queue. In accordance with the third embodiment of the present invention, the new BIS comprises a TTS and a pointer to upstream data to be transmitted. The method of the third embodiment then writes the TTS and the pointer to upstream data to be transmitted into an upstream hardware register set. The third embodiment of the present invention is now described in more detail below with reference to FIG. 4b.

FIG. 4b shows a flowchart of the third embodiment of the present inventive method. At a decision STEP 230' the inventive method first determines whether any TTS of the plurality of upstream hardware register sets equals the current system timer. If so, the method proceeds to a STEP 240', else the method proceeds to a decision STEP 210'. At the STEP 240' the method transmits an upstream data packet associated with the TTS that equals the current system timer (as determined in the decision STEP 230'). The method then proceeds to the decision STEP 210' whereat the method determines whether the CM has received a new upstream data packet. If so, the method proceeds to a STEP 220', else the method returns to the decision STEP 230'. At the STEP 220' the method creates a new BIS and writes information regarding the new upstream data packet into an upstream hardware register set. In one embodiment, the new BIS comprises a TTS and a pointer to upstream data to be transmitted. The information regarding the new upstream data packet comprises the TTS and the pointer to upstream data to be transmitted.

A Fourth Embodiment of the Present Invention

In accordance with a fourth embodiment of the present invention, the exemplary cable modem system comprises 32 upstream hardware register sets. In the exemplary cable modem system of the fourth embodiment of the present invention, a hardware register set comprises at least three registers: a DMA Source Address pointer register, a count/$L_{mod}$ register, and a TTS register. A DMA Source Address pointer register points to the upstream data packet information to be sent on the upstream. In an alternative embodiment, the hardware register set further comprises a TTS offset register. A description of an exemplary hardware register set is shown below in Table 1.

TABLE 1

CMAC Upstream input DMA pointer

| Bits | Type | Default | Name | Description |
|---|---|---|---|---|
| | | Register: CU_In_DMA_PTR{x} | | Location: 32'h???????? |
| [23:2] | RW | 22'hxxxxxx | DMA1_Ptr1 | Value to be loaded into DMA1_Ptr1 register, when it is time to transmit burst number {x}. |
| [1:0] | RO | 2'b00 | | Reserved |

CMAC Upstream input Buffer size/Pointer mode

| Bits | Type | Default | Name | Description |
|---|---|---|---|---|
| | | Register: CU_In_DMA_Cnt{x} | | Location: 32'h???????? |
| [25:24] | RW | 2'b00 | DMA1_Lmode | Value to be loaded into DMA1_Cnt1 register, when it is time to transmit burst number {x}. |
| [10:0] | RW | 11'hxxx | DMA1_Cnt1 | Value to be loaded into DMA1_Cnt1 register, when it is time to transmit burst number {x}. |

CMAC Upstream input Time To Send

| Bits | Type | Default | Name | Description |
|---|---|---|---|---|
| | | Register: CU_In_TTS{x} | | Location: 32'h???????? |
| [31:0] | RW | 32'hxxxxxxxx | CU_TTS | Value to be compared (after subtracting the offset. See next register) to the system timer to decide when it is time to transmit burst number {x}. |

CMAC Upstream input Time To Send Offset

| Bits | Type | Default | Name | Description |
|---|---|---|---|---|
| | | Register CU_In_TTS_Offset | | Location: 32'h???????? |
| [31:0] | RW | 32'hxxxxxxxx | CU_TTS_Offset | Value to be subtracted from the CU_TTS before it is compared to the system timer to decide when it is time to transmit burst number {x}. This offset will allow the HW some time to preprocess the burst. |

Table 1 shows the hardware registers of an exemplary upstream hardware register set in accordance with the fourth embodiment of the present invention. The "CU_In_DMA_PTR{x}" hardware register contains a pointer to the Source Address where an upstream data packet is located (i.e., DMA list pointer register). The "CU_In_TTS{x}" register contains a value to be compared to the system timer to decide when it is time to transmit burst number {x} (i.e., TTS register) and the CU_In_DMA_PTR{x} register contains the size of the upstream data packet and control mode for the DMA hardware. A "burst" is also known as an upstream data packet. The hardware sends a burst in any well-known manner. In accordance with the present invention, the value to be compared to the system timer can be adjusted by an offset contained in the "CU_In_TTS_Offset" register. In the exemplary embodiment, "{x}" is an integer value between 0 and 31, inclusive.

An upstream message processor aids the method of the fourth embodiment in determining which upstream hardware register sets are "free" (i.e., not presently in use). Table 2 shows exemplary hardware registers of an upstream message processor in accordance with the fourth embodiment of the present invention. The exemplary upstream message processor comprises four input status registers.

use (i.e., upstream data packet information is currently written into the corresponding upstream hardware register set). When a bit of the CU_In_Use register is set to a logical "0", the bit's corresponding input burst register set is "free". The "CU_In_To_Free_OK" and "CU_In_To_Free_Error" hardware registers are utilized by the present inventive method to locate which frame has been transmitted and to free an input queue and associated data buffers. The exemplary embodiment utilizes the "CU_In_Free_index" register to locate available upstream hardware register sets.

In accordance with the embodiment, method begins by determining whether a cable modem has created a new BIS. If so, the method finds an available upstream hardware register set and writes data packet information into the free register set. The method writes a TTS, a count/$L_{mod}$ value

TABLE 2

CMAC Upstream input Free/In use

| Bits | Type | Default | Register: CU_In_Use<br>Name | Location: 32'h????????<br>Description |
|---|---|---|---|---|
| [31:0] | RO | 32'h00000000 | CU_IN_Use | Bits in this register signal the state of the corresponding upstream hardware register set:<br>Bit {x} = 0 -> set {x} of upstream hardware registers is free.<br>Bit {x} = 1 -> set {x} of upstream hardware registers is in use. |

CMAC Upstream input transit from in use to free

| Bits | Type | Default | Register: CU_In_To_Free_OK<br>Name | Location : 32'h????????<br>Description |
|---|---|---|---|---|
| [31:0] | RO | 32'h00000000 | CU_IN_To_Free_OK | Bits in this register signal that the state of the corresponding upstream hardware register set has been changed from in use to free because the data packet has been sent correctly to the upstream modulator. Bit {x} will be set to 1 by hardware when changing state of upstream hardware register set {x} from in use to free. All bits will be reset to 0 after the microprocessor reads the register. |

| Bits | Type | Default | Register:CU_In_To_Free_Error<br>Name | Location : 32'h????????<br>Description |
|---|---|---|---|---|
| [31:0] | RO | 32'h00000000 | CU_IN_To_Free_Error | Bits in this register signal that the state of the corresponding upstream hardware register set has been changed from in use to free because error occurred and the burst was not sent. Bit {x} will be set to 1 by hardware when changing state of upstream hardware register set {x} from in use to free. All bits will be reset to 0 after the microprocessor reads the register |

CMAC Upstream input first free index

| Bits | Type | Default | Register: CU_In_Free_index<br>Name | Location : 32'h????????<br>Description |
|---|---|---|---|---|
| [5:0] | RO | 6'b00000 | CU_IN_Free_Index | Index {x} of the first (lowest) free set of upstream hardware registers. If all sets are in use the value will be 6'b111111. If all register sets are free the value will be 5'b000000. |

In the upstream message processor of the fourth embodiment of the present invention, the "CU_In_Use" hardware register comprises a 32-bit register wherein a bit represents a status of a corresponding upstream hardware register set. When a bit of the CU_In_Use register is set to a logical "1", the bit's corresponding upstream hardware register set is in and a pointer to upstream data to be transmitted into the available upstream hardware register set. The method then proceeds to compare all of the TTS registers of the upstream hardware register sets to the current system timer. The method transmits an upstream data packet when the data packet's associated TTS equals the current system timer.

The fourth embodiment of the present invention is now described in more detail hereinbelow with reference to FIG. 5.

Figure 5:
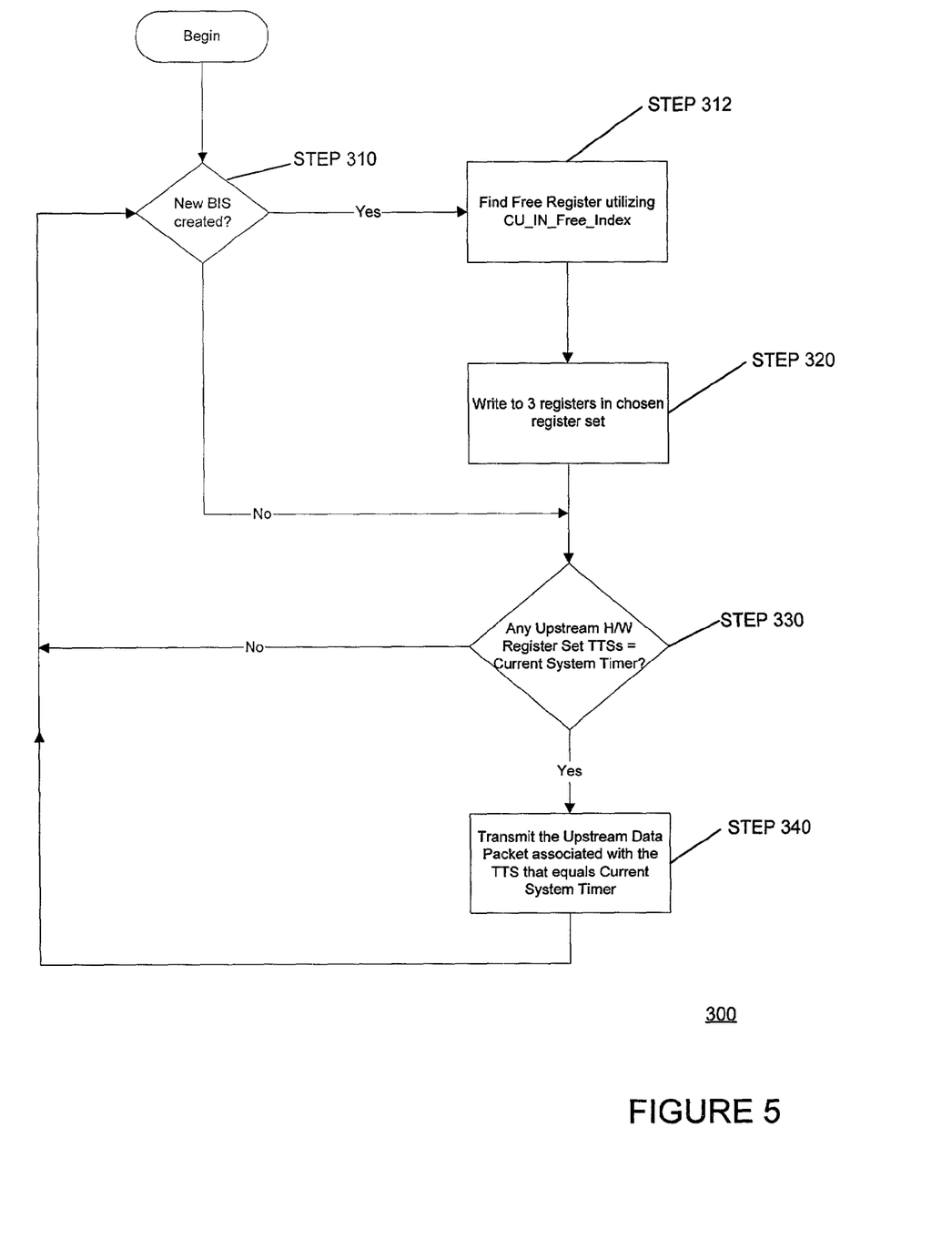
FIG. 5 shows a flowchart of a fourth embodiment of the method of the present invention.

FIG. 5 is a flowchart of a fourth embodiment of the method of the present invention. As shown in FIG. 5, at a decision STEP 310 the method determines whether the CM has created a new BIS. Whenever the CM receives a new upstream data packet in the input queue, the CM creates a new BIS. If a new BIS was created, the method proceeds to a STEP 312, else the method proceeds to a decision STEP 330. At the STEP 312 the upstream firmware utilizes the above-described CU_In_Free_index register to find an available upstream hardware register set. The method then proceeds to a STEP 320.

At the STEP 320, the method writes information regarding the new upstream data packet into the available upstream hardware register set found in the STEP 312. The information pertaining to the new upstream data packet comprises the TTS and the pointer to upstream data to be transmitted. The upstream firmware writes to the CU_In_DMA_PTR, CU_In_DMA_Cnt and CU_In_TTS registers of the free upstream hardware register set. In one embodiment, the upstream firmware writes to the CU_In_TTS register after writing to the other registers of the free upstream hardware register set. After the CU_In_TTS register of the free upstream register set has been written, the upstream message processor marks an index for this upstream hardware register set index as in use and will update the CU_In_Use and the CU_In_Free_index registers of the upstream message processor.

At the decision STEP 330, the method determines whether any TTS of the plurality of upstream hardware register sets equals the current system timer. If so, the method proceeds to a STEP 340, else the method returns to the decision STEP 310. At the STEP 340 the method transmits an upstream data packet associated with the TTS that equals the current system timer as determined in the decision STEP 330.

The upstream hardware transmits the associated upstream data packet at the STEP 340 utilizing the information provided in the upstream hardware register set that is associated with the matching TTS. After completing transmission of the upstream data packet, the upstream hardware marks an index of the register set as available. The hardware also updates the four status registers of the upstream message processor. The upstream hardware updates the status registers and issues an interrupt if required to do so after it transmits an upstream data packet. In one embodiment, the upstream firmware utilizes the CU_In_to_Free_OK and CU_In_To_Free_Error registers to locate the frame that has been transmitted and to free the input queue and associated data buffers. The method then returns to the decision STEP 310.

SUMMARY

A novel method and apparatus for scheduling upstream data packets utilizing a hardware register interface in a broadband communication system has been described, wherein the method obtains a priority value (PV) for an upstream data packet. The method of the present invention compares the PV of a queued upstream data packet to a current system timer. In accordance with one embodiment of the present invention, the current system timer comprises the current clock time of the communication system. When a PV equals the current system timer the method transmits the upstream data packet that is associated with the PV to the CMTS via the upstream transmission path.

A number of embodiments of the present invention have been described. Nevertheless, it will be understood that various modifications may be made without departing from the spirit and scope of the invention. For example, the present inventive method and apparatus can be implemented in an integrated circuit device, firmware, in a combinational logic circuit, Read-Only Memory, parallel clocking circuit, or serial clocking circuit. Furthermore, the present invention method and apparatus can be used in virtually any type of communication system. Its use is not limited to a cable modem communication system. Alternatively, the present invention can be used in a wireless communication system. Accordingly, it is to be understood that the invention is not to be limited by the specific illustrated embodiment, but only by the scope of the appended claims.

What is claimed is:

1. A method of scheduling upstream data packets utilizing a register interface in a data communication system, wherein the data communication system comprises a current system timer, at least one plurality of upstream hardware registers, and a plurality of upstream data packets, and wherein the upstream data packets have an associated priority value (PV), the method comprising the steps of:
   (a) queuing at least one upstream data packet for transmission over the data communication system;
   (b) identifying a priority value (PV) associated with the queued upstream data packet that has not been previously stored in an upstream hardware register;
   (c) storing the PV identified in step (b) in an available upstream hardware register;
   (d) determining whether any upstream hardware register contains a PV corresponding to a current system timer value; and
   (e) transmitting an upstream data packet that is associated with the PV determined in step (d) to be corresponding to the current system timer value.

2. The method of scheduling upstream data packets as defined in claim 1, wherein the priority value (PV) comprises a time-to-send (TTS) value.

3. The method of scheduling upstream data packets as defined in claim 1, wherein the PV comprises a sum of time-to-send (TTS) values and an offset value.

4. The method of scheduling upstream data packets as defined in claim 1, wherein the PV value includes a control message.

5. The method of scheduling upstream data packets as defined in claim 1, wherein the transmitting step (e) further includes the step of converting an upstream hardware register associated with the PV determined in step (d) to correspond to the current system timer value to a free upstream hardware register.

6. The method of scheduling upstream data packets as defined in claim 1, wherein the at least one plurality of upstream hardware registers comprises a parallel hardware register configuration.

7. The method of scheduling upstream data packets as defined in claim 1, wherein the at least one plurality of upstream hardware registers comprises a serial hardware register configuration.

8. The method of scheduling upstream data packets as defined in claim 1 wherein the at least one plurality of upstream hardware registers comprises a parallel-serial hardware register configuration.

9. The method of scheduling upstream data packets as defined in claim 1, wherein the at least one plurality of upstream hardware registers comprises 32 hardware registers.

10. The method of scheduling upstream data packets as defined in claim 1, wherein an upstream hardware register includes a pointer register and a PV register.

11. The method of scheduling upstream data packets as defined in claim 1, wherein the data communication system comprises a cable modem communication system.

12. A method of scheduling upstream data packets utilizing a parallel hardware register interface in a data communication system, wherein the data communication system includes a current system timer, a plurality of customer premise equipment (CPE) in communication with at least one associated and corresponding cable modem, and wherein the at least one cable modem has an associated and corresponding cable modem termination system (CMTS), the method comprising the steps of:
 (a) receiving new upstream data packets into at least one cable modem;
 (b) determining whether the at least one cable modem received a new upstream data packet;
 (c) creating a new burst information structure (BIS) and storing a time-to-send (TTS) and pointer value in an upstream hardware register, wherein the TTS and pointer values are associated with corresponding upstream data packets;
 (d) determining whether any of the TTS values stored in an associated upstream hardware register corresponds with a current system timer value; and
 (e) if any TTS value corresponds with the current system timer value, transmitting an upstream data packet that is associated with the TTS, else returning to step (a).

13. A method of scheduling upstream data packets utilizing a parallel hardware register interface in a data communication system, wherein the data communication system includes a system timer, a plurality of customer premise equipment (CPE) in communication with at least one associated and corresponding cable modem, and wherein the at least one cable modem has an associated and corresponding cable modem termination system (CMTS), the method comprising the steps of:
 (a) determining whether a new burst information structure (BIS) has been created;
 (b) obtaining an available upstream hardware register from a plurality of upstream hardware registers;
 (c) storing information pertaining to an upstream data packet associated with the new BIS in the available upstream hardware register if a new BIS was determined to be created in step (a);
 (d) determining whether a time-to-send (TTS) value associated with the plurality of upstream hardware registers corresponds to a current system timer value; and
 (e) if any TTS value is associated with the current system timer value, transmitting an upstream data packet that is associated with the TTS, else returning to step (a).

14. The method of scheduling upstream data packets as set forth in claim 13, wherein the step (b) of obtaining an available upstream hardware register uses a CU_IN_Free_Index register to find finding a free upstream hardware register.

15. The method of scheduling upstream data packets as set forth in claim 13, wherein the step (b) of obtaining an available upstream hardware register uses a CU_In_DMA_PTR register, a CU_In_DMA_Cnt register and a CU_In_TTS register for storing information pertaining to the available upstream hardware register.

16. An upstream data packet scheduler comprising a hardware register interface in a data communication system, wherein data is communicated using a plurality of upstream data packets, and wherein an upstream data packet has an associated and corresponding priority value (PV), comprising:
 (a) an upstream hardware register means, wherein the upstream hardware register means includes available and unavailable hardware registers;
 (b) means, coupled to the upstream hardware register means, for queuing upstream data packets for transmission over the data communication system;
 (c) means, responsive to the queuing means, for identifying a priority value (PV) associated with a queued upstream data packet that has not been stored in the upstream hardware register means;
 (d) means, responsive to the identifying means, for storing the PV identified by the identifying means in an available upstream hardware register;
 (e) means for maintaining a current system timer value;
 (f) means, operatively coupled to the system timer value means and the upstream hardware register means, for determining whether the hardware register means contains a PV that corresponds to the current system timer value; and
 (g) means, responsive to the determining means, for transmitting an upstream data packet that is associated with the PV determined by the determining means to correspond to the current system timer value.

17. An upstream data packet scheduler comprising a hardware register interface for use in a data communication system, wherein the data communication system comprises a system timer, a plurality of upstream hardware registers, and a plurality of upstream data packets, and wherein at least one upstream data packet has an associated and corresponding priority value (PV), comprising:
 (a) a PV register reader, wherein the reader determines whether a PV of queued upstream data packets received by a hardware register interface has been stored into an upstream hardware register;
 (b) an upstream hardware register writer, operatively coupled to the PV register reader and the plurality of upstream hardware registers, wherein the writer stores a PV associated and corresponding to an upstream data packet into an available upstream hardware register;
 (c) a register comparator, operatively coupled to the plurality of upstream hardware registers and the system timer, wherein the comparator determines whether any PV stored in the plurality of upstream hardware registers is associated with a current system timer value; and
 (d) said scheduler configured to operate with a transmitter; that is operatively coupled to the register comparator and transmits upstream data packets associated with and corresponding to a PV that is associated with the current system timer value.

18. A method of scheduling upstream data packets utilizing a hardware register interface in a data communication system, wherein the data communication system includes a current system timer, a plurality of upstream hardware registers, and a plurality of upstream data packets, and wherein each upstream data packet has an associated and corresponding priority value (PV), the method comprising the following steps:
 (a) a step for queuing upstream data packets for transmission over the data communication system;

(b) a step for identifying a priority value (PV) associated with a queued upstream data packet that has not been previously stored in an upstream hardware register;

(c) a step for storing the PV identified in step (b) in an available upstream hardware register;

(d) a step for determining whether any upstream hardware register contains a PV that corresponds to a current system timer value; and (e) a step for transmitting an upstream data packet that is associated with the PV determined in step (d) to correspond to the current system timer value.

19. A method of scheduling upstream data packets utilizing a parallel hardware register interface in a data communication system, wherein the data communication system includes a system timer, a plurality of customer premise equipment (CPE) in communication with at least one associated and corresponding cable modem, and wherein the at least one cable modem has an associated and corresponding cable modem termination system (CMTS), the method comprising the following steps:

(a) a step for determining whether a new burst information structure (BIS) has been created;

(b) a step for obtaining an available upstream hardware register from a plurality of upstream hardware registers;

(c) a step for storing information pertaining to an upstream data packet associated with the new BIS in the available upstream hardware register if a new BIS was determined to be created in step (a);

(d) a step for determining whether a time-to-send (TTS) value associated with the plurality of upstream hardware registers corresponds to a current system timer value; and (e) if any TTS value corresponds to the current system timer value, a step for transmitting an upstream data packet that is associated with the TTS, else returning to step (a).

* * * * *